United States Patent
Strijker (10) Patent No.: US 8,279,635 B2
(45) Date of Patent: Oct. 2, 2012

(54) DRIVING CIRCUIT

(75) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 12/845,581

(22) Filed: Jul. 28, 2010

(65) Prior Publication Data

US 2011/0026277 A1 Feb. 3, 2011

(30) Foreign Application Priority Data

Jul. 28, 2009 (EP) .................................... 09251895

(51) Int. Cl.
*H02M 3/335* (2006.01)
(52) U.S. Cl. ................ 363/21.07; 363/21.06; 363/21.14
(58) Field of Classification Search ............... 363/21.06, 363/21.07, 21.08, 21.09, 21.12, 21.14, 21.17, 363/21.15
See application file for complete search history.

(56) References Cited

U.S. PATENT DOCUMENTS

| | | | |
|---|---|---|---|
| 5,034,871 A * | 7/1991 | Okamoto et al. ............... 363/15 |
| 6,434,024 B2 * | 8/2002 | Shirato ...................... 363/21.07 |
| 6,865,094 B2 * | 3/2005 | Malik et al. ................ 363/21.12 |
| 7,054,169 B2 * | 5/2006 | Huh et al. .................. 363/21.16 |
| 2004/0076022 A1 | 4/2004 | Hong et al. | |
| 2005/0185431 A1 * | 8/2005 | Shimizu et al. ................. 363/65 |
| 2005/0270808 A1 | 12/2005 | Choi et al. | |
| 2010/0080023 A1 * | 4/2010 | Jain ................................ 363/65 |

FOREIGN PATENT DOCUMENTS

| JP | 09 093932 A | 4/1997 |
|---|---|---|
| WO | 2006/120640 A | 11/2006 |

OTHER PUBLICATIONS

W. Kleebchampee, et al.: 'Modeling and Control Design of a Current-Mode Controlled Flyback Converter with Optocoupler Feedback,' Power Electronics and Drives Systems 2005 International Conference on Kuala Lumpur, Malaysia, pp. 787-792, (Nov. 2005).
European Search Report for Patent Appln. No. EP09251895.0 (Jul. 2009).

* cited by examiner

*Primary Examiner* — Nguyen Tran

(57) ABSTRACT

A driving circuit for an opto-coupler comprising a switched mode regulator configured to convert a first voltage to a second voltage, the switched mode regulator operable in accordance with a control signal (311) representative of the first voltage, and wherein the second voltage is used to drive the diode (304*a*) of the opto-coupler (304), in use.

12 Claims, 9 Drawing Sheets

FIGURE 9b

DRIVING CIRCUIT

FIELD OF INVENTION

The present disclosure relates to the field of driving circuits for opto-couplers, devices comprising driving circuits, and methods of operating driving circuits.

BACKGROUND OF THE INVENTION

Opto-couplers are used in switched mode power supplies (SMPS) and other systems that require mains isolated communications. Systems may be isolated from a mains power supply in order to protect the system from any surge events that may affect the mains supply. Mains isolation is typically used to protect people, and every electronic device that is powered from the mains supply needs isolation. If there are no metal parts that can be touched, the electronics does not need mains isolation as the isolation is taken care of by the (plastic) casing. If there are metal parts like external connections on notebook charger output plugs, television scart cables, or computer usb connections for example, then the electronics needs isolation from the mains. If electronic communication between the mains isolated side and the non-isolated side is required, then in many cases opto-couplers are used.

An opto-coupler typically contains an infra-red light emitting diode (LED) and a photo-detector, as is known in the art. Typically the diode voltage of the opto-coupler is about 1 volt. In some systems, a much higher voltage is used for controlling the opto-coupler, and the excess voltage can be dropped across a linear regulator and/or a series resistor.

The listing or discussion of a prior-published document or any background in the specification should not necessarily be taken an acknowledgement that the document or background is part of the state of the art or is common general knowledge.

SUMMARY OF THE INVENTION

According to a first aspect of the invention, there is provided a driving circuit for an opto-coupler comprising:

a switched mode regulator configured to convert a first voltage to a second voltage, the switched mode regulator operable in accordance with a control signal representative of the first voltage, and wherein the second voltage is used to drive the diode of the opto-coupler, in use.

According to one or more embodiments, a switched mode regulator may be considered as any component or group of components that has more than one state of operation that can be switched between (for example on and off states of operation). The different states of operation can enable a first (input) voltage to be converted to a second (output) voltage, and such conversion can often involve the use of components that can store and release charge/energy, although in theory an ideal transformer can be used that does not store energy.

Use of the switched mode regulator can enable an efficient conversion from the first voltage to the second voltage without consuming unnecessary amounts of energy. The second voltage may be closer to the voltage level that is required to operate the opto-coupler diode, and therefore the timing of the operation of the switched mode regulator can be used to control the second voltage level. This may be in contrast to using energy dissipating components such as linear regulators that are known from the prior art.

The first voltage may be an output voltage of a switched mode power supply (SMPS) that is controlled by the opto-coupler, and the second voltage may be an intermediate voltage level that is appropriate for a specific opto-coupler diode.

The second voltage may be lower than the first voltage. In some examples, the second voltage and/or first voltage may have ripple, in which case, the average value of the second voltage may be less than the average value of the first voltage.

The switched mode regulator may be a switched inductor circuit. Such a switched mode regulator can be used to charge an inductor when the switched mode regulator is in a first state of operation, and discharge the inductor when the switched mode regulator is in a second mode of operation. The opto-coupler diode can be provided with a current through the switched mode regulator when the switched mode regulator is on, and through the inductor when the switched mode regulator is off.

The driving circuit may comprise an output connector, a ground connector, an inductor and a first switch. The inductor, first switch and opto-coupler diode may be connected in series between the output connector and ground connector, and the operation of the switch may be controlled in accordance with the control signal. It will be appreciated that the inductor, switch and opto-coupler can be connected in series in any order to achieve the desired functionality of a switched mode regulator.

The driving circuit may comprise an inductor and an output connector. A first pin of the inductor may be connected to the anode of the opto-coupler diode, and the second pin of the inductor may be connected to the output connector. In this way, the inductor can be charged from the output voltage when the switched mode regulator is on, and can discharge through the opto-coupler diode when the switched mode regulator is off. An inductor can be considered as an efficient component as it can store and discharge energy without consuming a significant of energy. This may be in contrast to a resistor as known from the prior art, as such a prior art resistor consumes energy without constructively contributing to the operation of the opto-coupler or an SMPS.

The switched mode regulator may comprise a first switch and a ground connector. The first switch may be configured to operably connect and disconnect the cathode of the opto-coupler diode to the ground connector. Operation of the switch may be controlled in accordance with the control signal. Closing the first switch may complete a circuit between the output connector and ground connector through the opto-coupler diode such that a voltage can be dropped across the opto-coupler diode.

The driving circuit may comprise two resistors in series between an output connector and a ground connector. The control signal may be provided from the junction between the two resistors. The two resistors may be considered as a resistive bridge, and in other examples the resistive bridge may comprise more than two resistors or a potentiometer, for example.

The control signal may be representative of a proportion of a first/output voltage, in use. The proportion of the output voltage that is provided as the control signal may be determined by the relative values of resistors in a resistive bridge.

The switched mode regulator may be operable in accordance with a plurality of control signals, each signal representative of different proportions of the first voltage. In this way, a switch of the switched mode regulator can be operated in order to maintain the first and/or second voltage substantially between upper and lower threshold values. In some embodiments, an SMPS associated with the driving circuit may be configured to be turned on and off in order to maintain an output voltage of the SMPS between upper and lower threshold values.

The driving circuit may comprise a capacitor connected between the first and second pins of the opto-coupler diode.

The capacitor may be used for filtering out unwanted high frequency signals, and may also be used for maintaining a current through the opto-coupler diode when the switched mode regulator is off.

The driving circuit may further comprise a discharge diode. A first pin of the discharge diode may be connected to a pin of the opto-coupler diode, and the second pin of the discharge diode may be connected to an output connector or a ground connector. It will be appreciated that any charge that is stored by the switched mode regulator can be discharged through the discharge diode, and that the orientation of the discharge diode can be set depending upon whether the switched mode regulator will be discharged to the ground connector or output connector.

The anode of the discharge diode may be connected to the cathode of the opto-coupler diode, and the cathode of the discharge diode may be connected to the output connector. The discharge diode may provide a path for the inductor and capacitor (if one is present) to discharge when the switched mode regulator is off. The discharge path may be through the opto-coupler diode in order to drop a voltage across the opto-coupler diode when the switched mode regulator is off.

The switched mode regulator may comprise a second switch connected between a pin (for example the cathode) of the opto-coupler diode and an output connector or a ground connector. The second switch may be controllable so as to be in the inverse position of the first switch of the switched mode regulator. The second switch may only define a path for the inductor and capacitor (if one is present) to discharge when the switched mode regulator is off. The discharge path may not be complete when the switched mode regulator is on as the second switch will be open. The discharge path may be through the opto-coupler diode in order to drop a voltage across the opto-coupler diode when the switched mode regulator is off.

The switched mode regulator may be a switched capacitor circuit.

The driving circuit may further comprise an output connector, a ground conductor and an inductor. The cathode of the opto-coupler diode may be connected to the output connector, the switched mode regulator may be connected between the anode of the opto-coupler diode and a ground connector. The inductor may be connected between the anode of the opto-coupler diode and the output connector. In this way, the diode of the opto-coupler can be in reverse bias when the switched mode regulator is on, and may only be provided with a forward bias current when the switched mode regulator is off and the inductor discharges. Such an embodiment may be used to provide pulses to a feedback input of an SMPS that can be used for timing and synchronisation purposes, for example There may be provided a switched mode power supply (SMPS) comprising an opto-coupler feedback component and any opto-coupler driving circuit disclosed herein.

There may be provided an integrated circuit comprising any opto-coupler driving circuit disclosed herein or any switched mode power supply disclosed herein.

There may be provided a circuit comprising:
an opto-coupler; and
a driving circuit for the opto-coupler;
wherein the driving circuit for the opto-coupler is configured to provide the diode of the opto-coupler with a voltage, the driving circuit for the opto-coupler diode comprising:
a switched mode regulator configured to convert a first voltage to a second voltage, wherein the second voltage is lower than the first voltage, the switched mode regulator operable in accordance with a control signal representative of the first voltage level, and wherein the second voltage is used to drive the diode of the opto-coupler, in use.

There may be provided a circuit comprising:
a switched mode power supply;
an opto-coupler; and
a driving circuit for the opto-coupler;
wherein the photodetector of the opto-coupler is configured to provide a feedback signal to the switched mode power supply and the driving circuit for the opto-coupler is configured to provide the diode of the opto-coupler with a voltage or a current, the driving circuit for the opto-coupler diode comprising:
a switched mode regulator configured to convert an output voltage of the switched mode power supply to an intermediate voltage that is lower than the output voltage of the switched mode power supply, the switched mode regulator operable in accordance with a control signal representative of the output voltage of the switched mode power supply, and wherein the lower intermediate voltage is used to drive the diode of the opto-coupler, in use.

One or more embodiments of the invention can relate to any opto-coupler circuit that is driven by a switched mode regulator.

There may be provided a circuit comprising:
an opto-coupler; and
a switched mode regulator for driving the opto-coupler.

The opto-coupler output signal may be configured for the control of the output voltage (or current) of a switched mode power supply. The opto-coupler may be configured to send any control signal (for example a protection signal) to a switched mode power supply.

The opto-coupler may be configured to send a control signal from an isolated side to a non-isolated side of any apparatus. The opto-coupler may be configured to send a control signal from a non-isolated side to an isolated side of any apparatus.

The circuit may be one or more integrated circuits.

According to a further aspect of the invention there is provided a computer program, which when run on a computer, causes the computer to configure any apparatus, including a circuit or a controller, disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

There may be provided an electronic device comprising a driving circuit or SMPS disclosed herein. The device may be battery driven, and improvements in efficiency can be particularly important for battery driven devices/applications as power may be limited. It will be appreciated that any device that includes an opto-coupler to isolate two circuits can use embodiments of the invention, and embodiments of the invention may have application in the mains isolation of a notebook adapter, personal computer power supplies, printer power supplies, television power supplies, battery chargers for cellular phones and any system that would benefit from a high efficiency at low load or no-load operation. In other examples, opto-couplers can be used to isolate process computers from machinery like computer numerical controlled (CNC)

machines such as CNC milling machines, or medical systems, and therefore one or more embodiments of the invention can also be used with these systems.

BRIEF DESCRIPTION OF THE DRAWINGS

A description is now given, by way of example only, with reference to the accompanying drawings, in which.

DETAILED DESCRIPTION OF EMBODIMENTS

One or more embodiments described herein relate to a driving circuit for an opto-coupler having a switched mode regulator that can provide a suitable voltage signal for driving the opto-coupler, in use. The suitable voltage signal may be considered as one in which reduced or minimal voltage is dropped across components that do not constructively contribute to the operation of the opto-coupler. Examples of such components can include resistors and/or linear regulators that are known from the prior art.

Embodiments of the invention described herein can provide a switched mode regulator that converts an output voltage of a switched mode power supply (SMPS) to a lower voltage value that is suitable for driving an opto-coupler, without requiring components that consume a significant amount of power. In some examples, switches, inductors, capacitors and/or diodes may be considered as components that do not consume a substantial amount of power.

Figure 1:
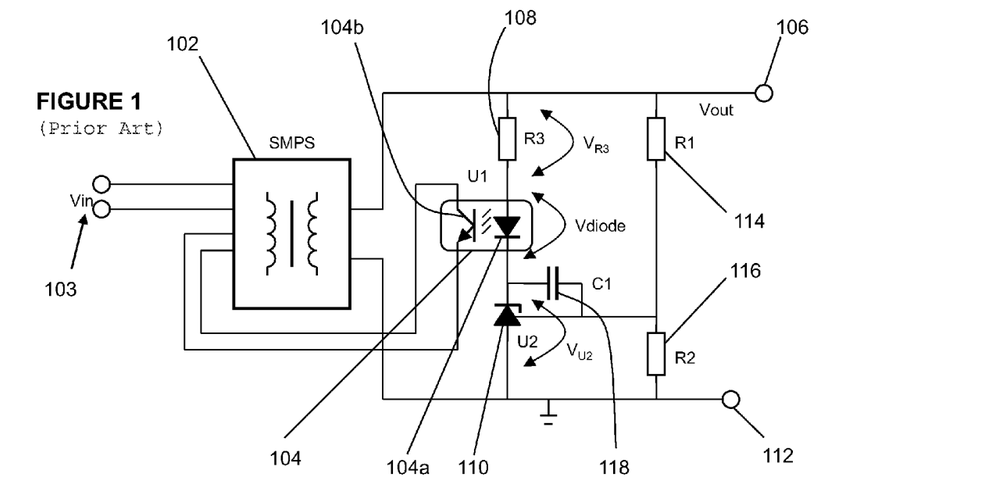
FIG. 1 illustrates a prior art switched mode power supply.

FIG. 1 illustrates a prior art switched mode power supply (SMPS) 102 with opto-coupler 104 feedback for controlling the output voltage. The SMPS 102 has input connectors 103 for receiving an input voltage Vin, an output connector 106 for providing an output voltage, and a ground output connector 112. As is known in the art, a signal generated by the photodetector 104b of the opto-coupler 104 is provided as feedback to the SMPS 102 in order to regulate the output voltage of the SMPS 102.

A typical voltage required by the diode 104a of the opto-coupler 104 is about 1 volt. A typical output voltage provided by an SMPS may be of the order of 20 volts, depending upon the device that is powered by the SMPS 102. Therefore a large proportion of the output voltage must be dropped across the resistor 108 and the linear regulator 110 in order to provide the diode 104a with the correct voltage.

In this example, the linear regulator 110 is a programmable shunt regulator, such as a known TL431 component. Use of such a regulator 110 and resistor 108 can cause the required amount of voltage to be dropped across these components so that the remaining voltage for the diode 104a of the opto-coupler 104 is about 1 volt, or whatever voltage is required.

A capacitor C1 118 is also coupled between the input pin and the cathode of the regulator 110 in order to filter out high frequency signals and improve loop stability, as is known in the art.

As can be seen from FIG. 1, a resistor divider between the output connector 106 and the ground connector 112 is provided by resistor R1 114 and resistor R2 116 in series. The junction between resistor R1 114 and resistor R2 116 is connected to the input pin of the regulator 110 such that the input pin of the regulator 110 is kept at 2.5 volts, thereby controlling the output of the SMPS 102 via the opto-coupler 104.

In this example, with an output voltage of 20 volts and a diode voltage of 1 volt, 95% ((20 v−1 v)/20 v) of the energy is lost across the resistor 108 and regulator 110. It will be appreciated that the energy is "lost" as it can be considered as not directly being used constructively for operation of the opto-coupler 104 or SMPS 102.

Figure 2:
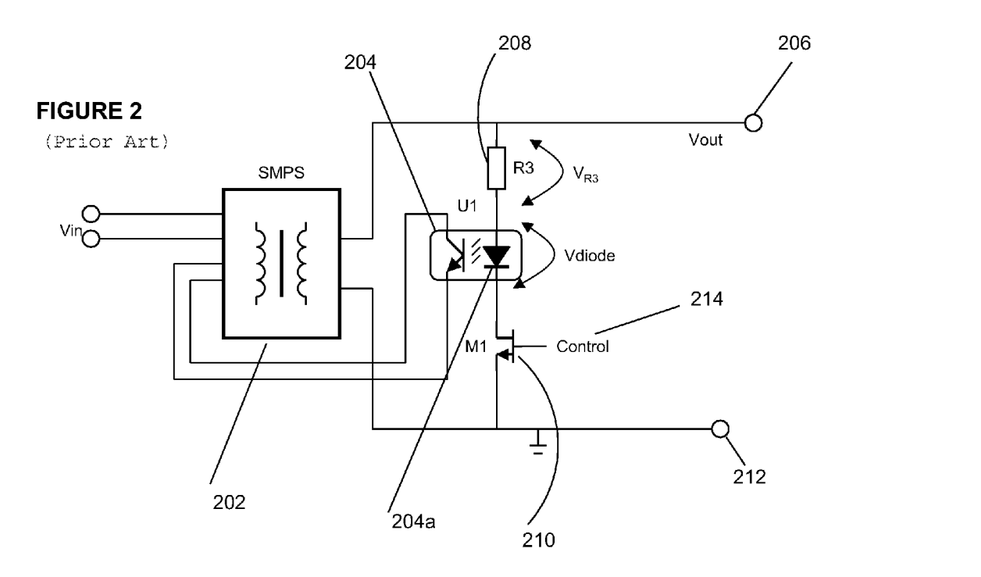
FIG. 2 illustrates a further prior art switched mode power supply.

FIG. 2 illustrates another prior art circuit for controlling an SMPS 202. In this embodiment, the diode 204a of the opto-coupler 204 is connected in series with a resistor R3 208 and a field effect transistor M1 210 between the output connector 206 and ground connector 212.

According to this prior art example, the field effect transistor 210, which operates as a switch, is controlled by a binary control signal 214. The binary control signal either opens or closes the switch 210 depending upon whether the SMPS 202 is to be switched on or not.

This prior art example enables a reduced amount of energy to be lost when the SMPS is not being used as the resistor R3 208 and opto-coupler diode 204a are not conducting when the switch 210 is open. However, resistor R3 208 is still used to drop a large proportion of the output voltage of the SMPS 202 when the SMPS 202 is on, in order that the correct voltage is provided to the opto-coupler diode 204a.

In this prior art example, energy is still lost across resistor R3 208 if the output voltage 206 is significantly higher than the opto-coupler diode 204a voltage.

Figure 3A:
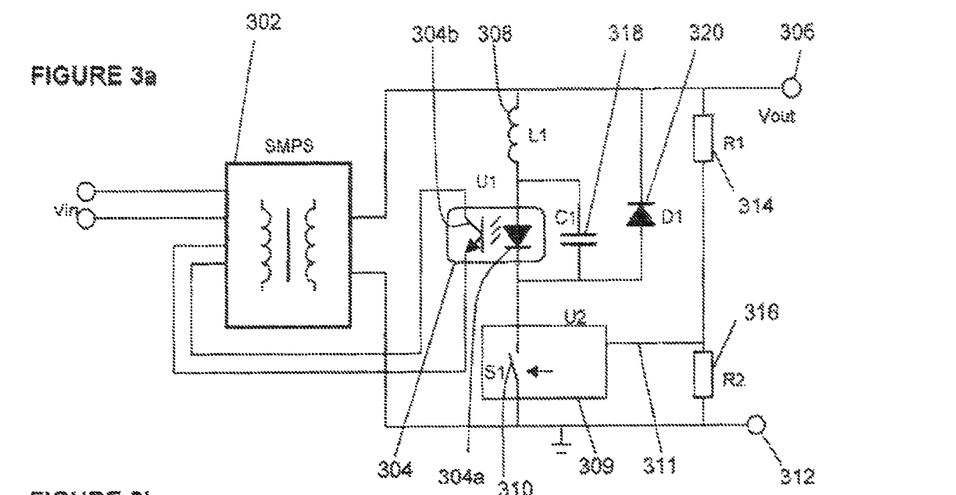
FIG. 3a illustrates a driving circuit for an opto-coupler according to an embodiment of the invention.

FIG. 3a illustrates an SMPS 302 and an opto-coupler 304 that is driven by a driving circuit according to an embodiment of the invention. The driving circuit in this example is a switched inductor circuit. According to such an embodiment, a linear regulator and resistor in series with the opto-coupler 304 may not be required, therefore reducing the amount of voltage that is "lost" and improving the efficiency of operation of the SMPS 302.

The photo-detector 304b of the opto-coupler 304 is connected as a feed-back input to the SMPS 302 as known in the art.

The opto-coupler diode 304a is coupled between an output connector 306 and a ground connector 312 in series with an inductor L1 308 and switch S1 310. In this example, a first pin of the inductor L1 308 is connected to the output connector 306 and a second pin of the inductor L1 308 is connected to the anode of the opto-coupler diode 304a. The cathode of the opto-coupler diode 304a is connected to a first pin of the switch 310 and a second pin of the switch 310 is connected to the ground connector 312. It will be appreciated, and is in contrast to the prior art, that the components with which the opto-coupler diode 304a is connected in series do not dissipate a significant amount of energy, and therefore a high efficiency of operation can be achieved.

A filtering capacitor C1 318 is connected in parallel with the opto-coupler diode 304a. A diode D1 320 is connected between the cathode of the opto-coupler diode 304a and the output connector 306. As described in more detail below, the anode of the diode D1 320 is connected to the cathode of the opto-coupler diode 304a, and the cathode of the diode D1 is connected to the output connector 306. In this way the inductor L1 308 and capacitor C1 318 can be discharged through the opto-coupler diode 304a when the switch S1 is open. In some embodiments the diode D1 320 may be referred to as a discharge diode.

The switch S1 310 is part of a switching component U2 309 that receives a control signal 311 to control operation of the switch 310. The control signal 311 is provided by a resistive divider, which comprises resistors R1 314 and R2 316.

In this example, the values of resistors R1 314 and R2 316 are selected so as to provide a control signal 311 at about 2.5 volts. For example, in embodiments where the output voltage is to be 20 volts, R1 may be 350 KΩ and R2 316 may be 50 KΩ. This can provide a control signal 311 with a current of 50 μA. Such a control signal 311 can be considered as suitable for operating the switching component U2 309. The timing diagram of the operation of the switch S1 310 of the switching component U2 309 is shown as reference 350 in FIG. 3b.

If the control signal 311 voltage is too high, then operation of the switch 310 is controlled so as to reduce the output voltage Vout and therefore reduce the control signal 311 voltage. Similarly, if the control signal 311 voltage is too low, then operation of the switch 309 is controlled so as to increase the output voltage Vout.

It will be appreciated that the switch S1 310 is part of a switched mode regulator such that the switch S1 310 can be switched on and off to control the opto-coupler diode 304a current. The inductor 308 and diode D1 320 may also be considered as part of the switched mode regulator.

Figure 3B:
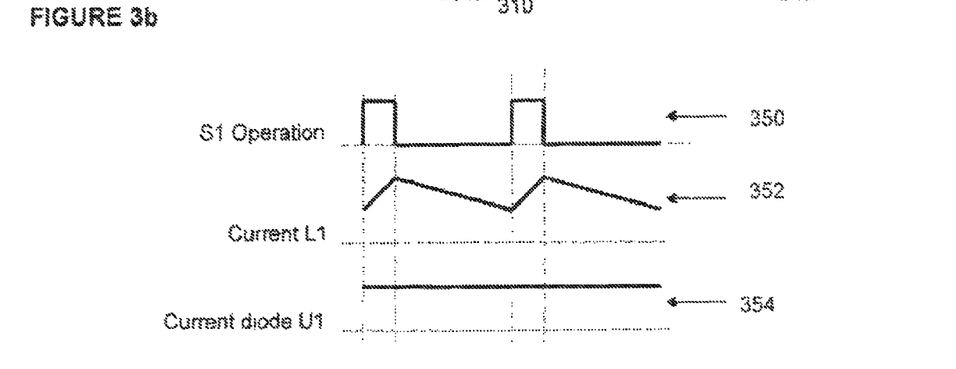
FIG. 3b illustrates a timing diagram of the driving circuit of FIG. 3a, in use.

When the switch S1 310 is closed, a circuit between the output connector 306 and ground connector 312 is completed, and the current through the inductor L1 308, opto-coupler diode 304a and switch S1 310 rises. The current through inductor L1 308 is shown in FIG. 3b as reference 352. As the current through the inductor L1 308 is rising, energy is stored in the inductor L1 308.

The diode D1 320 is reverse biased by the output voltage 306 when the switch is closed, and therefore no current flows through the diode D1 320.

When the switch S1 310 is opened, the current through the inductor L1 308 gradually falls as the inductor discharges through the opto-coupler diode 304a and diode D1 320. In addition, the capacitor C1 318, which has also stored charge while the switch S1 310 is closed, discharges through the opto-coupler diode 304a and diode D1 320 when switch S1 310 is open.

It will be appreciated that operation of the opto-coupler 304 according to the circuit illustrated in FIG. 3a can behave in a manner that is similar to a known buck converter, although operation that is similar to any other known SMPS may also be provided. As shown in FIG. 3b, the current through the inductor L1 308 does not fall to zero, and therefore the circuit may be considered as operating in continuous mode. This is further evidenced by the current through the opto-coupler diode 304a being substantially constant, which is shown with reference 354 in FIG. 3b. In some examples, a small amount of ripple may be present in the opto-coupler diode current 354 although such ripple may be considered insignificant or inconsequential.

The circuit illustrated in FIG. 3a can provide a substantially constant current through the opto-coupler diode 304a, without losing/wasting energy on components that do not contribute to the operation of the SMPS 302 or opto-coupler 304. That is, the voltage that is dropped across the inductor L1 308 and switch S1 310 that are in series with the opto-coupler diode 304a may be less than components that are connected in series with an opto-coupler diode of the prior art.

A typical value for the inductor L1 308 is of the order of a few pH, for example, 400 μH, and the capacitor C1 318 may be of the order of 1 μF.

To control the opto-coupler 304 of FIG. 3a, losses of about 35% of the energy associated with an output voltage of 20 volts may occur. This compares favourably with the losses of 95% associated with the prior art circuit illustrated in FIG. 1. As described below, it can be possible to reduce the losses further by using different components. It will be appreciated that a compromise can be made between the energy losses of the opto-coupler driving circuit and the complexity and cost of the driving circuit.

Figure 3C:
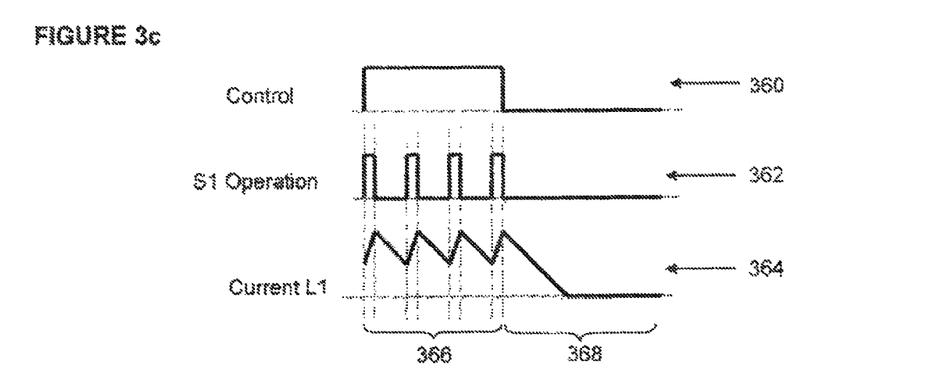
FIG. 3c illustrates a timing diagram of a driving circuit of an embodiment of the invention.

FIG. 3c illustrates a timing diagram of the operation of a circuit that is similar to that illustrated in FIG. 3a. A difference between the circuit of FIG. 3a and that used to generate the timing diagram of FIG. 3c is that a further control signal (identified with reference 360 in FIG. 3c) is used to provide on/off control of the opto-coupler. The timing diagram of FIG. 3c shows two stages of operation: a first time period 366 when the opto-coupler is on, and a second period 368 when the opto-coupler is off.

It can be seen that operation of a switch S1 when the opto-coupler is on provides for operation that is similar to that shown in FIG. 3b. Operation of the switch S1 is shown schematically in FIG. 3c with reference 362.

As can be seen from the current through the inductor, which is shown as reference 364 in FIG. 3c, the current is maintained above zero for the time period when the opto-coupler is on 366, and is allowed to fall to zero when the opto-coupler is off 368.

Figure 3D:
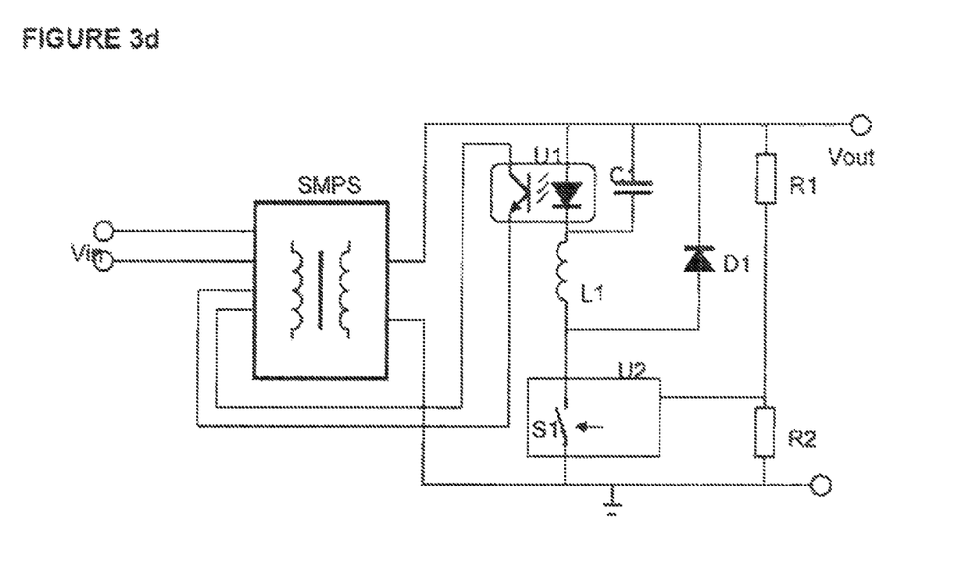
FIGS. 3d to 3f illustrate driving circuits according to alternative embodiments of the invention.
Figure 3E:
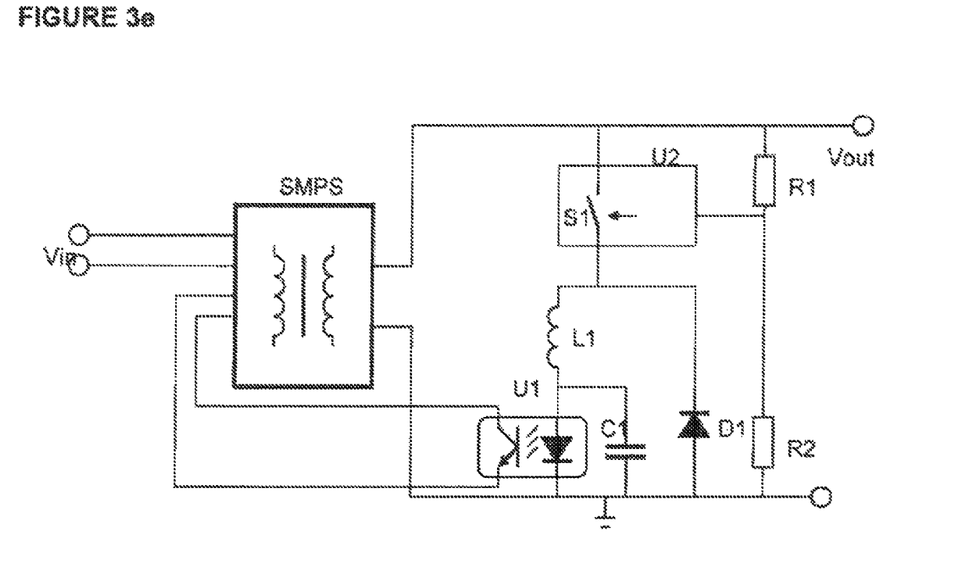
Figure 3F:
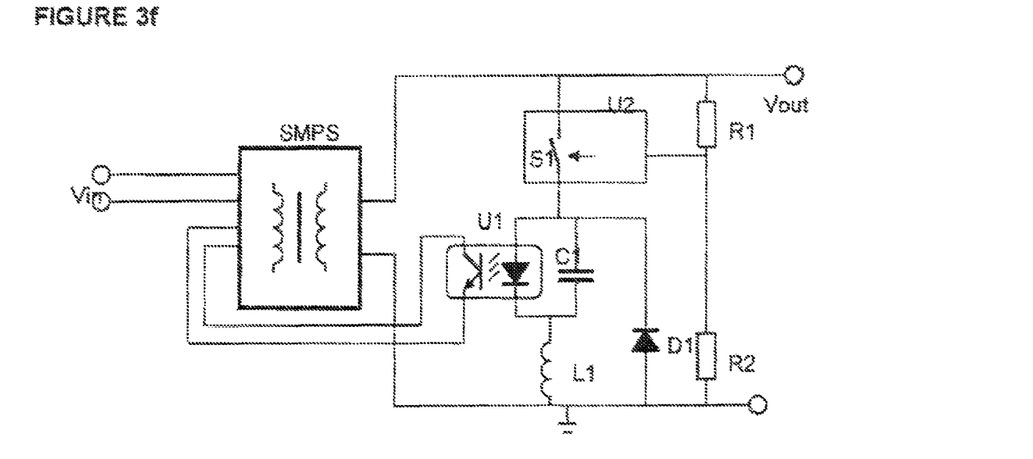

FIGS. 3d to 3f illustrate circuit diagrams according to further embodiments of the invention. It will be appreciated that the components of the opto-coupler driving circuit of FIG. 3a may be placed in different relative positions whilst still performing the same functionality. For example, the opto-coupler diode 404a, switch S1 410 and inductor L1 308 could be connected in any order in series between the output connector 306 and ground connector 312. Similarly, the capacitor C1 318 and/or inductor L1 318 may be configured to discharge through the opto-coupler diode 304a to either the ground connector or output connector 306.

It will also be appreciated that similar modifications could be made to any of the circuits disclosed herein without affecting the functionality of the circuit.

Figure 4A:
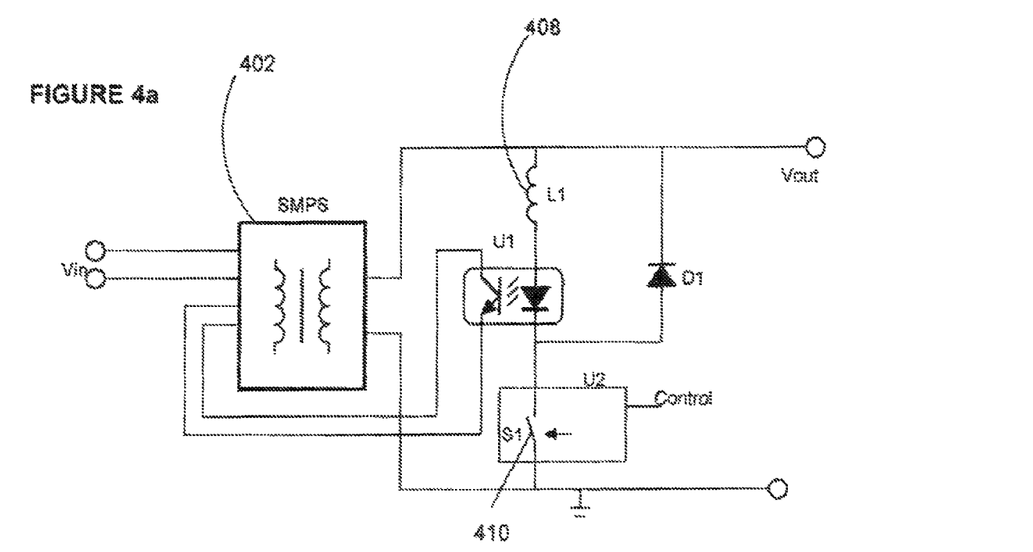
FIG. 4a illustrates a driving circuit according to another embodiment of the invention.

FIG. 4a illustrates a circuit diagram of an embodiment of the invention that is similar to that of FIG. 3a. In this example, the filtering capacitor C1 that is shown in FIG. 3a has been omitted.

Figure 4B:
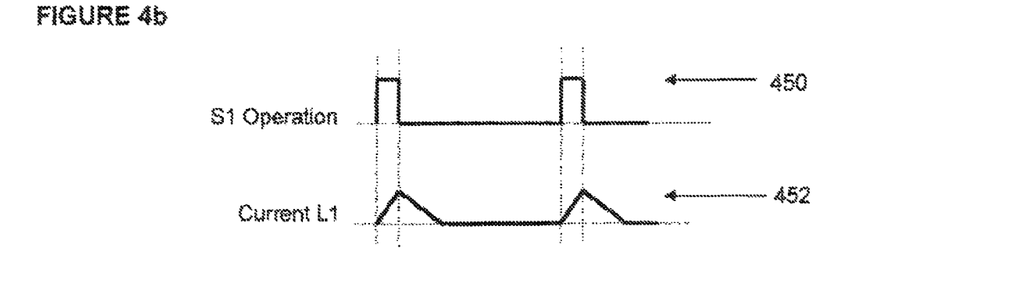
FIG. 4b illustrates a timing diagram of the driving circuit of FIG. 4a, in use.

A timing diagram showing signals associated with the circuit FIG. 4a is shown as FIG. 4b. More particularly, the operation of the switch S1 is shown with reference 450, and the current through the inductor L1 408 is shown with reference 452.

With such an example, it can be seen that the inductor current 452 is allowed to fall to zero in between successive operations of the switch S1 410. This is because the capacitor is not connected and contributing to the inductor current when the switch S1 410 is open. Such embodiments may be advantageous when it is desired to transfer pulses as feedback to the SMPS 402, for example for timing and/or synchronisation purposes.

Figure 5A:
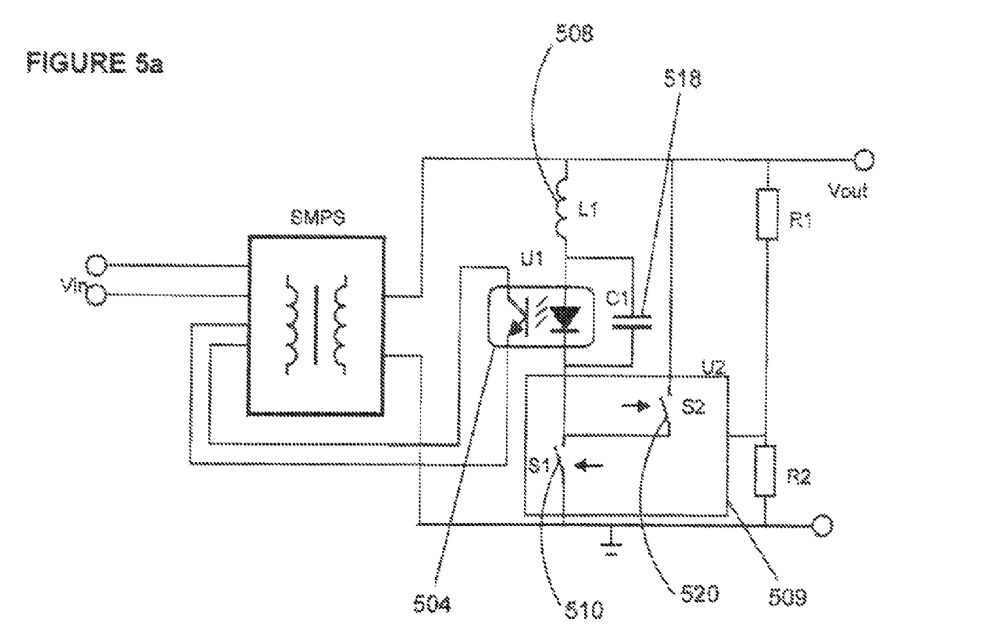
FIG. 5a illustrates a further embodiment of a driving circuit according to an embodiment of the invention.

FIG. 5a illustrates a further embodiment of a driving circuit for an opto-coupler 504 according to an embodiment of the invention. In this example, the diode D1 320 of FIG. 3a has been replaced by a second switch S2 520. The second switch S2 520 can also be considered as part of the switched mode regulator. Such an embodiment can further improve the efficiency of the driving circuit, because a smaller voltage is dropped across the second switch S2 520 than the voltage that is dropped across the diode D1 320 of FIG. 3a.

Figure 5B:
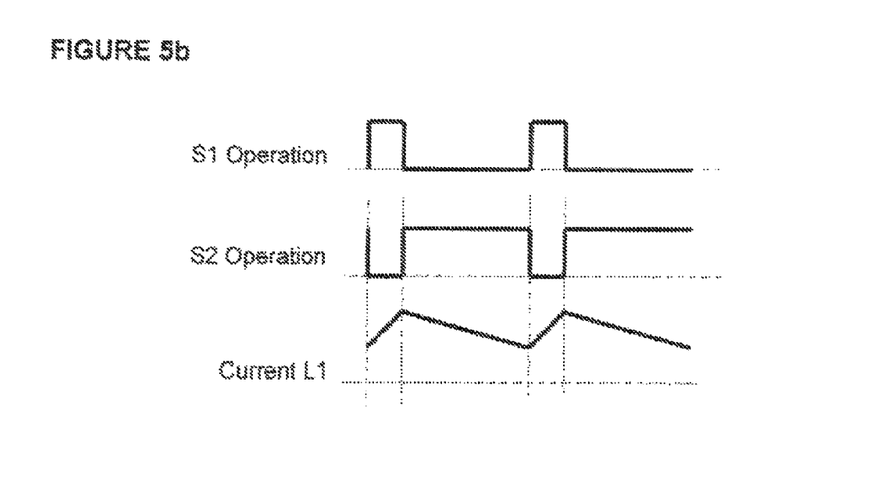
FIG. 5b illustrates a timing diagram of the driving circuit of FIG. 5a, in use.

A suitable example of a switch S2 520 can include a field effect transistor, such as a MOSFET. As shown in FIG. 5b, the operation of the second switch S2 520 is the inverse of the operation of the first switch S1 510. Operation of the switches S1 510 and S2 520 in this way enables the inductor L1 508 and capacitor 518 to be charged when first switch S1 510 is closed and second switch S2 520 is open, and discharged when first switch S1 510 is open and second switch S1 520 is closed.

As can be seen from FIG. 5b, the current through the inductor L1 508 is similar to that shown in FIG. 3b, although the voltage that is wasted when the switch S1 510 is in an open position can be further reduced, and therefore the efficiency can be improved further. It will be appreciated that the capacitor C1 518 may be omitted from the circuit of FIG. 5a in order to provide timing pulses that are similar to those generated by the circuit of FIG. 4.

Figure 6A:
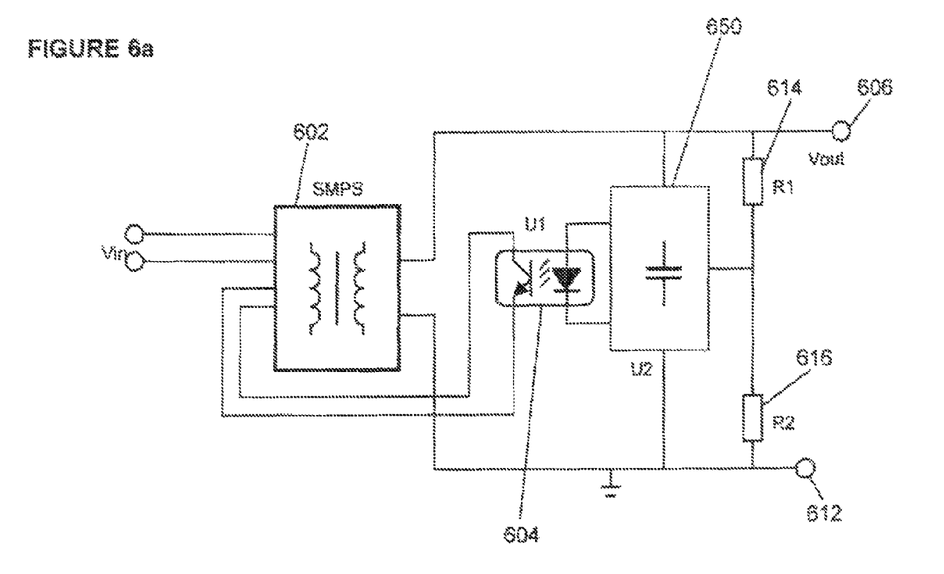
FIG. 6a illustrates a driving circuit according to another embodiment of the invention.

FIG. 6a illustrates an opto-coupler driving circuit according to another embodiment of the invention. In this example, the opto-coupler 604 is driven by a switched capacitor circuit 650. The switched capacitor circuit 650 is powered by the output voltage of the SMPS 602, and is configured to convert the output voltage to a lower intermediate voltage that is more suitable for powering the opto-coupler 604.

Figure 6B:
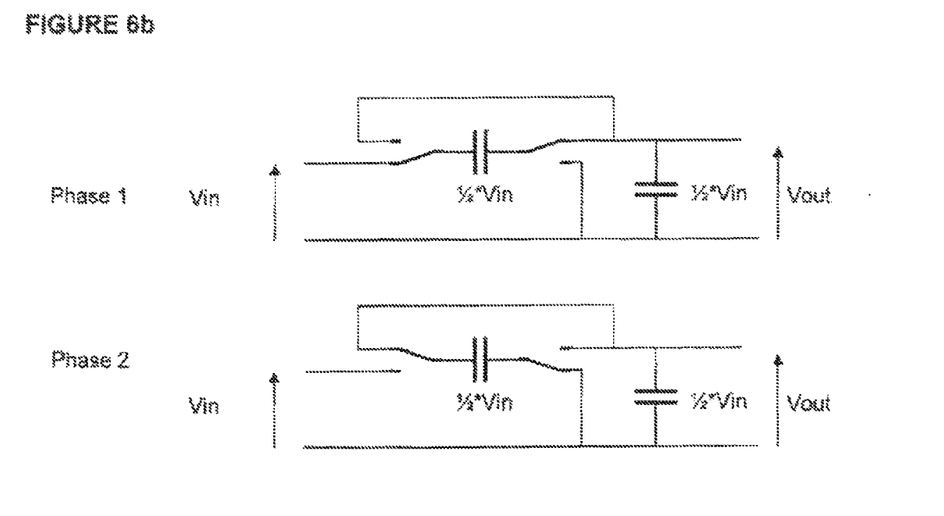
FIG. 6b illustrates a switched capacitor circuit that can be used with embodiments of the present invention.

It will be appreciated that switched capacitor circuits 650 are known in the art, and an example of two phases of a typical switched capacitor circuit are shown as FIG. 6b. In this example, the output voltage is half the input voltage (Vout=Vin/2). Switched capacitor circuits can be considered as efficient because the capacitors do not consume a significant amount of energy as they are charged and discharged. Similarly, although the switches of the capacitor switching circuit may suffer from switching losses, these may be less than the losses associated with prior art opto-coupler driving circuits such as those shown in FIGS. 1 and 2.

Embodiments that use a switched capacitor circuit as a switched mode regulator can offer advantages in terms of the integration of the switched mode regulator into an integrated circuit. It may be relatively easy and cost efficient to integrate capacitors onto integrated circuits.

Figure 7:
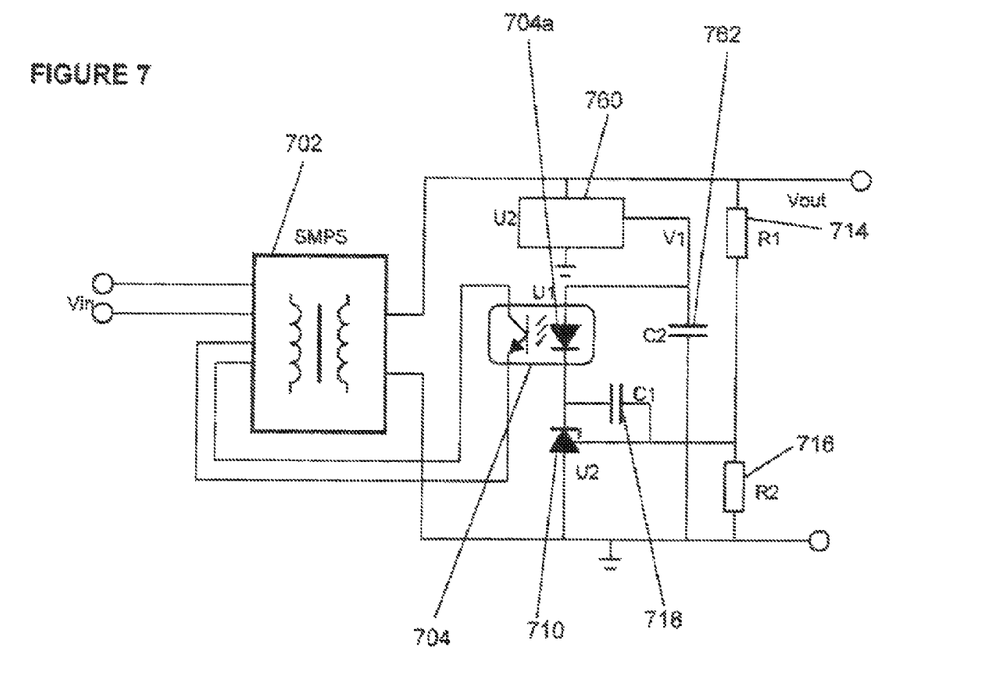
FIG. 7 illustrates a driving circuit according to a further still embodiment of the invention.

FIG. 7 shows another driving circuit according to an embodiment of the invention. In this example, the opto-coupler is 704 is driven from a lower (intermediate) voltage that is generated by an additional second switched mode power supply 760. A linear regulator 710 is also provided in series with the opto-coupler 704 so as to drop a voltage that enables the desired voltage to be provided across the opto-coupler diode 704a. Operation of the linear regulator is similar to that described and illustrated with reference to FIG. 1.

In FIG. 7, the second switched mode power supply (SMPS) 760 may be a buck converter or switched capacitor circuit, for example. The second SMPS 760 generates a voltage V1 from the output voltage Vout, where V1 is used for driving the opto-coupler 704. The value of V1 is lower than Vout in order to reduce the voltage that needs to be dropped across the linear regulator 710 and therefore provide a more efficient opto-coupler driving circuit than the prior art.

It will be appreciated that although the linear regulator 710 will consume power that does not directly contribute to the control of the opto-coupler 704, the driving circuit of FIG. 7 is improved over the prior art as the amount of power that needs to be consumed in order to provide the opto-coupler 704 with the required voltage is reduced through use of the SMPS 760.

In some examples, the SMPS 760 may be a switched capacitor circuit such as the one illustrated as FIG. 6b. That is, the output voltage of the SMPS 702 of FIG. 7 can be efficiently divided by two before being supplied as the driving voltage for the opto-coupler diode 704a.

Figure 8A:
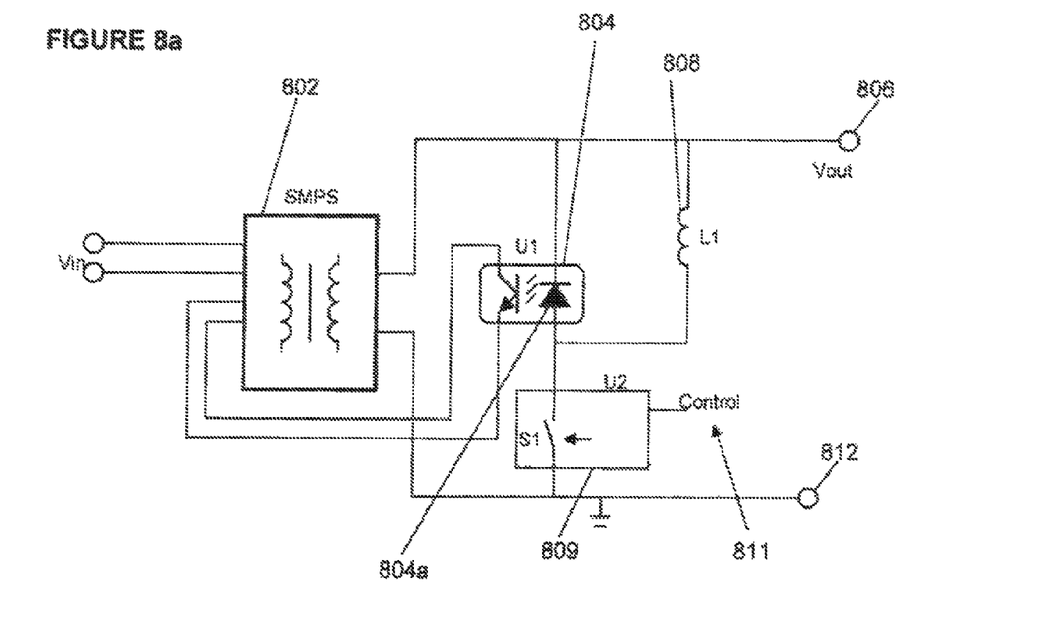
FIG. 8a illustrates a driving circuit according to an embodiment of the invention.
Figure 8B:
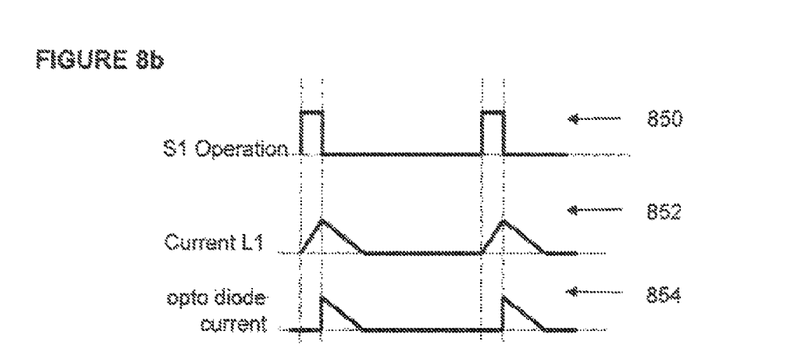
FIG. 8b illustrates a timing diagram of the driving circuit of FIG. 8a, in use.

FIG. 8a illustrates an opto-coupler driving circuit according to another embodiment of the invention, and FIG. 8b illustrates a timing diagram of signals within the circuit of FIG. 8a. In this example, a switching component 809 is provided in series between the opto-coupler diode 804a and the ground connector 812.

In FIG. 8a, the opto-coupler diode 804a is connected between the output connector 806 and ground connector 812 in reverse bias, that is the cathode of the opto-coupler diode 804a is connected to the output connector 806 and the anode of the opto-coupler diode 804a is connected to a first terminal of the switched mode regulator 809. A second terminal of the switched mode regulator 809 is connected to the ground connector 812.

An inductor L1 808 is connected between the anode of the opto-coupler diode 804a and the output connector 806 in order to provide a current through the opto-coupler diode 804a by discharging the inductor L1 808 when the switching component 809 is off.

The circuit of FIG. 8a provides a lower component count than that of FIG. 4a, for example. The diode D1 from FIG. 4a can be omitted as long as the reverse breakdown voltage of the opto-coupler diode 804a is high enough. The reverse breakdown voltage of the opto-coupler diode 804a needs to be at least the output voltage so that breakdown does not occur during normal operation of the SMPS 802.

The signals of the circuit of FIG. 8a are slightly different to those of FIG. 4a as can be seen by comparing the timing diagrams of FIGS. 4b and 8b. FIG. 8b shows a switch signal 850 representative of the operation of the switch S1, an inductor signal 852 representative of the current through the inductor L1 808, and an opto-coupler signal 854 representative of the current through the opto-coupler diode 804a.

As can be seen from FIG. 8b, the inductor L1 808 is charged when the switch S1 of the switched mode regulator is closed, and at the same time the opto-coupler diode 804a is reverse biased and therefore no current flows through the opto-coupler diode 804a. When the switch S1 of the switched mode regulator is open, the inductor L1 808 discharges through the opto-coupler diode 804a in order to provide a pulse of current to the opto-coupler diode 804a. It will be appreciated that the pulse of current occurs until the inductor L1 808 is completely discharged, and that the pulse can be used for timing or synchronization purposes in the same way as the pulses generated by the circuit of FIG. 4a.

In other embodiments a capacitor can be provided in order to smooth the opto-coupler diode 804a current so that a more consistent opto-coupler diode 804a can be generated.

The efficiency of the circuit of FIG. 8a can be even higher than the circuit of FIG. 4a as energy is not wasted across the extra diode D1 of FIG. 4a.

The control signal 811 may be provided from a resistive bridge across the output of the SMPS as in FIG. 3, and in such examples the output voltage may be regulated. This can be performed by providing pulses through the opto-coupler, but with a continuous current. If pulses are used, and if the circuit of FIG. 8a is used to control the output voltage, then the output signal of the opto-coupler photodetector may need to be filtered in the SMPS 802 so as to be a suitable feedback signal for the SMPS 802. Filtering the opto-coupler output signal may create a more or less constant signal to control the SMPS 802. In some examples, pulses could be used for timing purposes, and the pulse signal could also be filtered to provide a suitable signal for analog control.

Figure 9A:
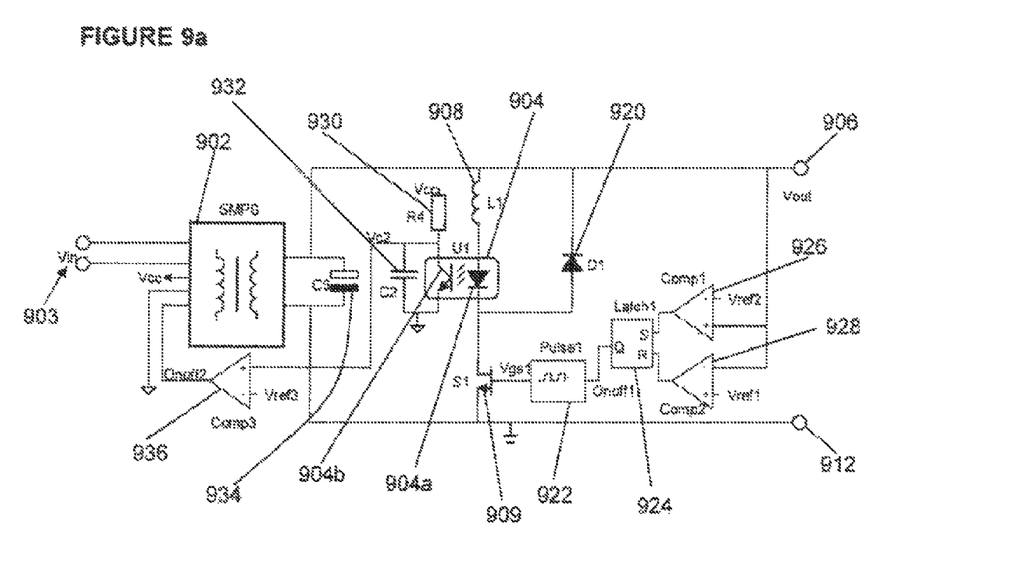
FIG. 9a illustrates a driving circuit according to an embodiment of the invention.
Figure 9B:
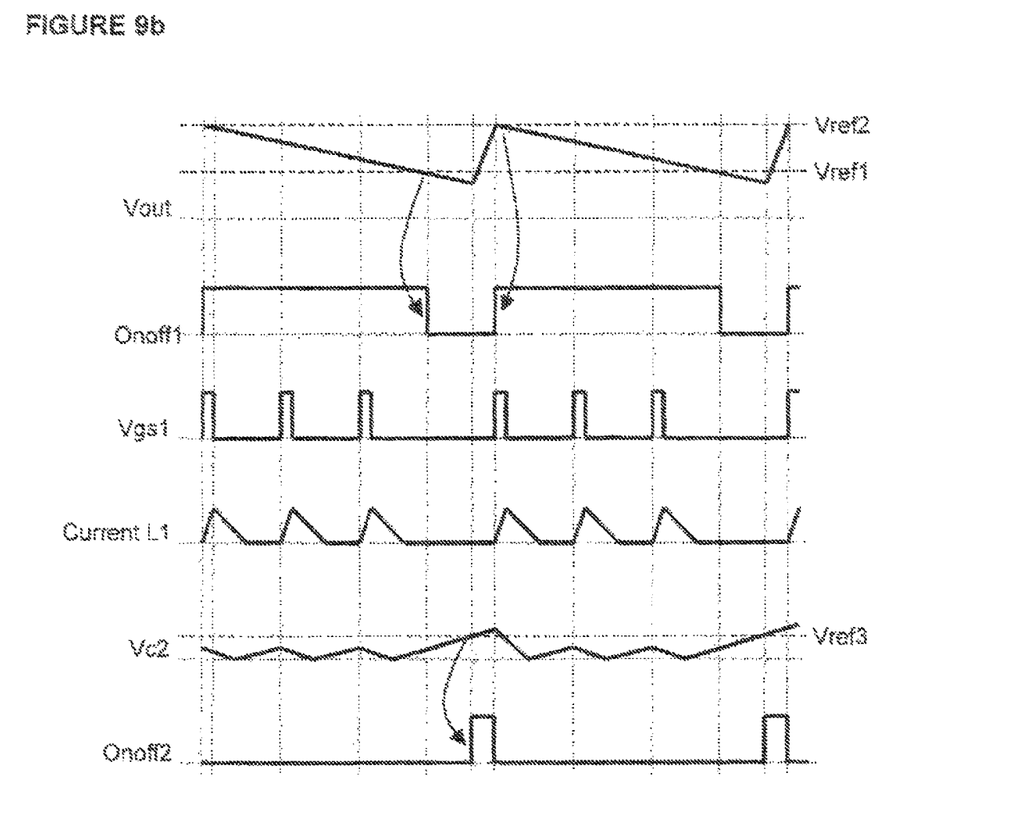
FIG. 9b illustrates a timing diagram of the driving circuit of FIG. 9a, in use.

FIG. 9a illustrates an opto-coupler driving circuit according to another embodiment of the invention, and FIG. 9b illustrates a timing diagram of signals within the circuit of FIG. 9a. The circuit of FIG. 9a makes it possible to provide a switched mode power supply with a very low standby power because the SMPS 902 is switched off for a large proportion of time. As described in more detail below, capacitors and reference voltages are provided in combination with a switched mode regulator in order to efficiently achieve a required standby current to monitor for "switch-on" operations for an SMPS 902.

The circuit of FIG. 9a includes an SMPS 902 that receives an input voltage Vin 903 and has two outputs. One of the outputs of the SMPS 902 is connected to an output connector 906 and the other output is connected to a ground connector 912. The SMPS 902 is an isolated converter such as a fly-back converter that has a primary non-isolated side and a secondary isolated side, although the SMPS 902 can be of any known type. The primary side of the SMPS 902 can receive a control signal from the secondary side via an opto-coupler 904 in order to turn off the primary side and not unnecessarily consume power to keep the SMPS in standby mode, as will be described in detail below.

A recharge capacitor C3 934 is connected between the outputs of the SMPS 902. Capacitor C3 934 is charged when the SMPS 902 is on, and discharged when the SMPS 902 is off. The discharging of the capacitor C3 934 contributes to a gradually falling output voltage when the SMPS 902 is off, without significantly consuming any energy from an input voltage source.

In this example, the switching on and off of the SMPS 902 is controlled so as to maintain an output voltage substantially between two reference voltages Vref1 and Vref2. The actual output voltage at the output connector 906 may lag behind the processing that is used to control it, for example the output voltage may drop below Vref1 whilst the required processing is performed to increase the output voltage, and such lag may be considered as insignificant and inconsequential to operation of the circuit. An example of such a lag is shown in FIG. 9b, where the Vout signal can be seen to temporarily drop below Vref1. In some embodiments, the values for Vref1 and Vref2 may be selected to take into account any processing lags and ensure that the output voltage is controlled appropriately.

Also coupled between the outputs of the SMPS 902 is an opto-coupler 904. The anode of the opto-coupler diode 904a is connected in series with an inductor L1 908 to the output connector 906. The cathode of the opto-coupler diode 904a is connected to the drain of a MOSFET 909, and the source of the MOSFET 909 is connected to the ground connector 912. The MOSFET is operated as a switch as described below.

A diode D1 920 is also connected between the cathode of the opto-coupler diode 904a and the output connector 906. The diode D1 920 and inductor L1 908 operate in a similar way to the diode 320 and inductor 308 of FIG. 3 and can be considered in combination with the MOSFET 909 as providing a switched mode regulator.

With regard to the photodetector 904b of the opto-coupler 904, the collector of the photodetector 904b is connected to a voltage source Vcc by a resistor R4 930. The voltage at the collector of the photodetector 904b is also provided as the non-inverting input of a third comparator 936, and is illustrated as control signal Vc2 in FIGS. 9a and 9b.

The emitter of the photodetector 904b is connected to ground and also a first plate of a capacitor C2 932. The second plate of capacitor C2 932 is connected to the collector of the photodetector 904b. The opto-coupler 904 keeps the capacitor C2 932 discharged.

Returning to the third comparator 936, a third reference voltage signal Vref3 is provided as the inverting input to the third comparator 936. The output of the third comparator 936 is the control signal for the primary side of the SMPS 902, and is given reference Onoff2 in FIGS. 9a and 9b. When the Onoff2 signal is low, the SMPS 902 is disabled and therefore does not consume any significant energy. The Onoff2 signal is only set high when the voltage at the control signal Vc2 exceeds the value of Vref3. This can be considered as an indicator that the output voltage of the SMPS needs a boost in order to provide sufficient standby voltage.

The output voltage Vout is provided as the non-inverting input to a first comparator 926. A second reference voltage signal Vref2 is provided as the inverting input to the first comparator 926. The output of the first comparator 926 is provided as the "set" input of a latch 924 and as will be appreciated from the following description, the first comparator 926 is used to keep the output voltage Vout below the level of Vref2.

In addition, the output voltage Vout is provided as the inverting input to a second comparator 928. A first reference voltage signal Vref1 is provided as the non-inverting input to the second comparator 928. The output of the second comparator 928 is provide as the "reset" input of a latch 924 and as will be appreciated from the following description, the second comparator 928 is used to keep the output voltage substantially above the level of Vref1.

The signal at the Q output of the latch 924 is given reference Onoff1 in FIGS. 9a and 9b, and is provided to control the operation of a pulse signal generator 922. The output signal of the pulse signal generator 922 is given reference Vgs1. The pulse signal generator 922 is configured to generate the pulsed output signal Vgs1 with a fixed frequency and duty cycle when the control signal Onoff1 is high, and generate a zero output signal Vgs1 when the control signal Onoff1 is low. This can be seen from the timing diagram of FIG. 9b.

The gate of the MOSFET 909 is provided with the control signal Vgs1 in order to control the switching operation of the MOSFET 909.

It will be appreciated that operation of the circuit of FIG. 9a allows the output voltage Vout to drop to a certain value Vref1 as capacitor C3 934 discharges. When Vref1 is reached, the SMPS 902 is turned on for a short time to recharge capacitor C3 934, and increase the output voltage Vout. When Vout reaches a second voltage value Vref2, the SMPS 902 is switched off again so that it does not consume energy that is not necessary to keep the output voltage Vout of the SMPS 902 high enough to maintain a standby mode. This operation is then repeated so that the output voltage alternately rises towards Vref2 or falls towards Vref1.

The voltage level Vref2 may be considered as an upper threshold value for the output voltage, and the voltage level Vref1 may be considered as a lower threshold value for the output voltage. Such threshold values can be used in order to efficiently maintain a standby mode of operation of the SMPS 902.

As described in detail above, the efficiency of the opto-coupler feedback circuitry is high, and therefore the output voltage Vout drops very slowly. That is, the discharge current of capacitor C3 934 is low.

Use of one or more of the MOSFET 909, inductor 908, diode D1 920, first and second comparators 926, 928, latch 924 and pulse generator 922 can be considered as providing operation of a switched mode regulator in such a way that an efficient opto-coupler driving circuit, and therefore an efficient SMPS, can be achieved. The efficiency may be particularly noticeable when the SMPS 902 is in a standby mode.

For example, the circuit illustrated in FIG. 9a can be used to provide an integrated circuit that uses only 5 mW when the SMPS 902 is in a standby state. This may be achievable as the control signal (Onoff2) for the SMPS 902 may have a duty cycle of the order of 99%. In one example, the SMPS 902 may be off for 30 seconds as the control signal (Onoff2) is low, and then on for only 20 ms as the control signal (Onoff2) is high. 20 ms may be sufficiently long to start up the SMPS 902 and recharge the capacitor C3 934 for a further 30 seconds of operation in standby mode.

It will be appreciated that the reference voltages Vref1, Vref2 and Vref3 may be provided by a reference voltage circuit or reference voltage device. Example circuits can include use of a simple zener diode or a bandgap reference circuit, as is used in integrated circuits.

The invention claimed is:

1. A driving circuit for an opto-coupler comprising:
a switched mode regulator configured to convert a first voltage to a second voltage, the switched mode regulator operable in accordance with a control signal representative of the first voltage, and wherein the second voltage is used to drive a diode of the opto-coupler;
wherein the switched mode regulator is a switched inductor circuit; and
wherein the driving circuit comprises an output connector, a ground connector, an inductor, and a first switch;
wherein the inductor, the first switch and the diode are connected in series between the output connector and the ground connector, and wherein operation of the first switch is controlled in accordance with the control signal.

2. The driving circuit of claim 1, wherein the second voltage is lower than the first voltage.

3. The driving circuit of claim 1, wherein the driving circuit comprises two resistors in series between an output connector and a ground connector, wherein the control signal is provided from the junction between the two resistors.

4. The driving circuit of claim 1, wherein the control signal is representative of a proportion of an output voltage.

5. The driving circuit of claim 1, wherein the switched mode regulator is operable in accordance with a plurality of control signals, each signal representative of different proportions of the first voltage.

6. The driving circuit of claim 1, wherein the driving circuit comprises a capacitor connected between the anode and cathode of the diode.

7. The driving circuit of claim 1, further comprising a discharge diode, wherein a first pin of the discharge diode is connected to a pin of the diode, and a second pin of the discharge diode is connected to the output connector or the ground connector.

8. The driving circuit of claim 1, wherein the switched mode regulator comprises a second switch connected between a pin of the diode and the output connector or the ground connector, wherein the second switch is controllable so as to be in the inverse position of the first switch of the switched mode regulator.

9. The driving circuit of claim 1, wherein the switched mode regulator is a switched capacitor circuit.

10. A circuit comprising:
a switched mode power supply;
an opto-coupler having a photodetector and a diode; and
a driving circuit for the opto-coupler;
wherein the photodetector of the opto-coupler is configured to provide a feedback signal to the switched mode power supply and the driving circuit for the opto-coupler is configured to provide the diode of the opto-coupler with a voltage or a current, the driving circuit for the opto-coupler comprising:
a switched mode regulator configured to convert an output voltage of the switched mode power supply to an intermediate voltage that is lower than the output voltage of the switched mode power supply, the switched mode regulator operable in accordance with a control signal representative of the output voltage of the switched mode power supply, and wherein the lower intermediate voltage is used to drive the diode of the opto-coupler;
wherein the switched mode regulator is a switched inductor circuit; and
wherein the driving circuit comprises an output connector, a ground connector, an inductor, and a first switch;
wherein the inductor, the first switch, and the diode are connected in series between the output connector and the ground connector, and wherein operation of the first switch is controlled in accordance with the control signal.

11. An integrated circuit comprising an opto-coupler driving circuit of claim 10.

12. A driving circuit for an opto-coupler comprising:
a switched mode regulator configured to convert a first voltage to a second voltage, the switched mode regulator operable in accordance with a control signal representative of the first voltage, and wherein the second voltage is used to drive a diode of the opto-coupler; and
an output connector;
a ground connector; and
an inductor;
wherein the cathode of the diode is connected to the output connector, the switched mode regulator is connected between the anode of the diode and the ground connector, and the inductor is connected between the anode of the diode and the output connector.

* * * * *